United States Patent

Higashira et al.

[11] Patent Number: 5,908,457
[45] Date of Patent: Jun. 1, 1999

[54] AUTOMOBILE STEERING SYSTEM INCLUDING REACTION FEEDBACK TO OPERATOR

[75] Inventors: Hideki Higashira, Ikoma; Shiro Nakano, Chihayaakasaka-mura, both of Japan

[73] Assignee: Koyo Seiko Co., Ltd., Osaka, Japan

[21] Appl. No.: 08/754,525

[22] Filed: Nov. 21, 1996

[30] Foreign Application Priority Data

Nov. 24, 1995 [JP] Japan ................................. 7-305847

[51] Int. Cl.$^6$ ................................ G06F 7/70; G06G 7/76
[52] U.S. Cl. ................................ 701/41; 701/36; 701/42; 701/43; 180/446; 180/402
[58] Field of Search ................................ 701/41, 42, 43, 701/36; 180/169, 272, 416, 422, 446, 421, 427, 402, 441, 443, 444, 423, 429, 197, 412

[56] References Cited

U.S. PATENT DOCUMENTS

| | | | |
|---|---|---|---|
| 4,212,366 | 7/1980 | Ohtuka et al. | 180/422 |
| 5,247,441 | 9/1993 | Serizawa et al. | 701/41 |
| 5,251,135 | 10/1993 | Serizawa et al. | 701/42 |
| 5,347,458 | 9/1994 | Serizawa et al. | 701/41 |
| 5,360,077 | 11/1994 | Nishimoto et al. | 701/43 |
| 5,447,209 | 9/1995 | Sasaki et al. | 180/422 |
| 5,511,630 | 4/1996 | Kohata et al. | 180/422 |
| 5,528,497 | 6/1996 | Yamamoto et al. | 701/41 |

FOREIGN PATENT DOCUMENTS

| | | |
|---|---|---|
| 42 32 256 | 4/1993 | Germany . |
| 42 07 719 | 9/1993 | Germany . |
| 62-120272 | 6/1987 | Japan . |
| 63-291770 | 11/1988 | Japan . |
| 63 291770 | 3/1989 | Japan . |
| 2-29017 | 2/1990 | Japan . |

*Primary Examiner*—Jacques H. Louis-Jacques
*Attorney, Agent, or Firm*—Darby & Darby

[57] ABSTRACT

A reaction force actuator 3 for giving reaction force to a steering wheel 2 disengaged from a steering mechanism 1 is provided. A steering control unit 4 is provided to control so that the reaction force decided in accordance with the detected results of the running speed by a vehicle speed sensor 6 and the detected results of a road surface condition by a current sensor 7a, an open air temperature sensor 7b, a wiper switch 7c and a supersonic wave sensor 7d. Also, the steering motor 5 for applying the steering force to the steering mechanism 1 is operated smaller at higher speed and larger at slower speed at running by the operation of the steering control unit 4 in accordance with the detected results of the running speed by the vehicle speed sensor 6. Therefore, the same steering feelings as those of the coupling type steering system are obtained to realize a steering system enabling the reliable steering operation to effect under the various different running conditions. Also, the bother of the steering operation at the slow speed or at the stop time is dissolved by simple construction.

9 Claims, 6 Drawing Sheets

AUTOMOBILE STEERING SYSTEM INCLUDING REACTION FEEDBACK TO OPERATOR

BACKGROUND OF THE INVENTION

1. Field of the Invention

The present invention relates generally to a steering system for causing an automobile to steer in accordance with the operation of a driver.

2. Description of the Related Art

The steering of the automobile is realized by transmitting the operation of steering operating means, for example, the rotation of the steering wheel arranged within the cabin to a steering mechanism which is disposed externally the cabin and operates the wheels for steering use (generally the front wheels).

Various types such as ball screw type, rack and pinion type or the like are put into practical use as an steering mechanism for the automobile. For example, a rack and pinion type steering mechanism, which is adapted to transmit through tie rods to knuckle arms provided on the front right and left wheels, the sliding movement along the length direction of the rack shaft extended in the right and left directions in the front portion of the automobile body, interlocks with the pinion engaged with the tip end of the rotation shaft (steering column) of the steering wheel extended out of the cabin with the rack teeth formed halfway in the rack shaft. Such steering mechanism converts the rotation of the steering wheels into the sliding, in the length direction, of the rack shaft to effect the steering operation in accordance with the rotating operation of the steering wheels.

Also, in recent years, in order to reduce steering burden of the driver, a power steering system is put into wider use. The powder steering system has an actuator for steering auxiliary use such as hydraulic cylinder, electric motor or the like halfway provided in the steering mechanism. The operation of the steering mechanism in accordance with the rotation of the steering wheel is assisted by the driving operation of the actuator in accordance with the detected results of the operating force applied to the steering wheel for steering operation.

But such a conventional steering system as described above has problems such as the mechanical coupling between the steering wheel as the steering operating means and the steering mechanism as the steering means is required in spite of whether or not it is constructed as a power steering system, and the arrangement position of the steering wheel within the cabin is restricted in a position at which coupling with the steering mechanism outside of the cabin can be realized. Also, complicated coupling construction is required for realizing the coupling therebetween even if the steering wheel is arranged in a position at which coupling with respect to the steering mechanism can be realized, thus resulting in factors interfering with light weight automobile, simpler assembling steps.

A steering system for automobiles designed to solve such problems is disclosed in Japanese Utility Model Publication No. 2-29017 (1990). In the steering system, the steering wheel is disengaged from the steering mechanism, and also, an electric motor is arranged as an actuator for steering use halfway in the steering mechanism as same in the actuator for assisting steering of the power steering system. The electric motor is driven in accordance with the detected results of the operating direction and operation amount of the steering wheel to effect the steering operation in accordance with the operation of the steering wheel.

The steering wheel disengaged from the steering mechanism has a reaction force actuator having a electric motor and a gear mechanism. The reaction force actuator applies the reaction force, which becomes larger or smaller in accordance with the vehicle speed and the steering angle, to the steering wheel by driving of the electric motor in accordance with the detected results of the vehicle speed and the steering angle. The steering operation is adapted to be effected with the same feelings as those of the general steering system (coupling type steering system) mechanically coupled between the steering wheel and the steering mechanism by increasing or decreasing the motor current of the electric motor for steering use in accordance with the detected results, namely, by increasing or decreasing the steering force generated by the electric motor on the basis of the detection result of the operation force to be applied to the steering wheel against the reaction force.

The conventional separation type steering system constructed above has following advantages. The steering system is useful for the development of the automobile technique in the future, as realization of the new steering means, such as a lever, a pedal, a joy stick and so on, replacing the conventional steering wheel, and realization of the automatic driving system following the driving information such as detection of the guiding marks on the road surface, reception of the information from satellites or the like, in addition to the above described objects such as increase of flexibility of the arrangement of the steering wheel, light weight automobile or the like. However, above conventional separation type steering system has following problems.

The operation force to be applied to the steering wheel for steering operation is necessary for changing the direction of the wheels for steering use against the reaction force from the road surface, and is known to become usually larger accompanied by the reduction in the vehicle speed, also larger accompanied by the increase in the steering angle. Accordingly, it is natural to feel lighter at the smaller steering operation at higher speed running of the steering wheel by a driver, and conversely, heavier at the larger steering operation at lower speed running by the direction action of such reaction force as described above in the case of the operation of the steering wheel in the general coupling type steering system.

On the other hand, in the separation type steering system disclosed in the above described Japanese Utility Model Publication No. 2-29017 (1990), the reaction force actuator provided on the steering wheel is adapted to apply the reaction force which becomes larger or smaller in accordance with one or both of the higher and lower vehicle speeds and the larger or smaller steering angles. But such a reaction force applying way does not correspond to the conventional general coupling type steering system. Therefore, unnatural operation feelings are given to the driver. The same steering operation as in the general steering system is not realized because of the generated force of the electric motor for steering use to be driven in accordance with the operation of the steering wheel against the reaction force.

Further, the reaction force from the road surface which is applied to the wheel for steering use does not increase or decrease simply by the vehicle speed and the steering angle. For example, even under the same conditions in the vehicle speed and the steering angle, the reaction force acting upon the wheel at running on the snow road becomes smaller than at running on the paved road, and reversibly, the reaction force acting upon the wheels at running on the gravel road becomes larger than at running operation on the paved road. In the separation type steering system disposed in the above described Japanese Utility Model Publication No. 2-29017 (1990), the same reaction force as that at running on the paved road is applied to the steering wheel even at running on the snow road or the gravel road. The steering wheel is effected against the reaction force so that there is a possibility of effecting an excessive steering operation by the driver at running on the snow road, thus causing slipping accidents to happen. Also, reversibly the driver may effect the excessively small steering operation at running on the gravel road so that the curve may not be turned by the driver.

On the other hand, there are request that the driver desires to reduce the operation force at steering and also, to reduce the operation amount to solve the bother of the steering operation when complicated steering operations onto both the right and left sides are necessary for the large reaction force in such a running condition at an extremely slow speed or at a substantially stop condition as garaging the automobile, bringing the automobile near to crosswise direction or the like. To meet such request, Japanese Patent Application Laid-Open No. 62-120272 (1987), Japanese Patent Application Laid-Open No. 63-291770 (1988) disclose that a change speed mechanism is arranged halfway in the steering column with the coupling type steering system as an object, and the operation amount of the steering mechanism with respect to the operating amount of the steering wheel is adapted to change to become larger at running in low speed or at stop time than at running in operation at the high speed by changes in the speed change ratio of the speed change mechanism in accordance with the detected results of the vehicle speed.

In such construction, heavy and massive components such as actuator or the like for speed changing are required for the speed change mechanism. Thus, it is difficult in reality to provide such speed change mechanism as described above halfway in the steering coelum. Even if the components are possible to arrange, it is unsuitable to go against the light weight automobile.

SUMMARY OF THE INVENTION

The present invention has been designed to solve such circumstances, and a primary object of the present invention is to provide a separation type steering system for an automobile capable providing a driver with steering feelings the same as those in the coupling type steering system, so that reliable steering operations can be realized under various different running conditions. Also, an another object of the present invention is to provide, by simple construction a steering system for an automobile which is free from the heaviness and bother of steering operation at low speeds or when at the vehicle is stopped.

A steering system for an automobile in accordance with a first aspect of the present invention comprises: steering operating means which is disengaged from a steering mechanism for an automobile; steering actuator for applying steering force to the steering mechanism to operate in accordance with the operating direction and operation amount of the steering operating means; reaction force giving means for giving reaction force opposite to the operating direction of the steering operating means to the steering operating means; steering controlling means for increasing or decreasing the steering force generated by the steering actuator in accordance with the magnitude of the steering force to be applied to the steering operating means against the reaction force given by the reaction force giving means; vehicle speed detecting means for detecting the running speed of the automobile; road surface condition detecting means for detecting the condition of the road surface on which the automobile is running; and reaction force controlling means for increasing or decreasing the reaction force generated by the reaction force giving means in accordance with the detection results of the road surface condition detecting means and the vehicle speed detecting means.

In such a first aspect of the present invention, the condition of the road surface on which the automobile is running is recognized indirectly through the current for driving the steering motor to be used as the steering actuator for applying the steering force to the steering mechanism against the reaction force from the road surface applied to the steering wheel. And the recognized results are corrected from the presumed results of the road surface condition based on the detected results of the surrounding environment of weathers, temperatures and so on, the detected results of the unevenness of the road surface by supersonic sensors arranged for, for example, the road surface to detect the road surface condition. The reaction force decided in accordance with the detected results and the detected results of the vehicle speed is generated by the reaction force giving means to operate the steering actuator in accordance with the operation of the steering operating means to be effected against the reaction force.

A steering system for an automobile in accordance with a second aspect of the present invention comprises: steering operating means which is disengaged from a steering mechanism for an automobile; steering actuator for applying steering force to the steering mechanism to operate in accordance with the operating direction and operation amount of the steering operating means; reaction force giving means for giving reaction force opposite to the operating direction of the steering operating means to the steering operating means; steering controlling means for increasing or decreasing the steering force generated by the steering actuator in accordance with the magnitude of the steering force to be applied to the steering operating means against the reaction force given by the reaction force giving means; and vehicle speed detecting means for detecting the running speed of the automobile; wherein the steering controlling means increases of decreases the variation ratio of the operation amount of the steering actuator with respect to the operating amount of the steering operating means based on the detected result of the vehicle speed detecting means.

In such a second aspect of the present invention, the variation ratio of the operation amount of the steering actuator with respect to the operation amount of the steering operating means is made larger in accordance with the reduction in the detected vehicle speed by the vehicle speed detecting means, and further the heaviness and bother of the steering operation at the running in slow speed or at the stop time are removed, because the larger steering operation is effected in accordance with the slight operation of the steering operating means at running in slow speed or at the stop time.

The above and further objects and features of the invention will more fully be apparent from the following detailed description with the accompanying drawings.

DESCRIPTION OF THE PREFERRED EMBODIMENTS

Figure 1:
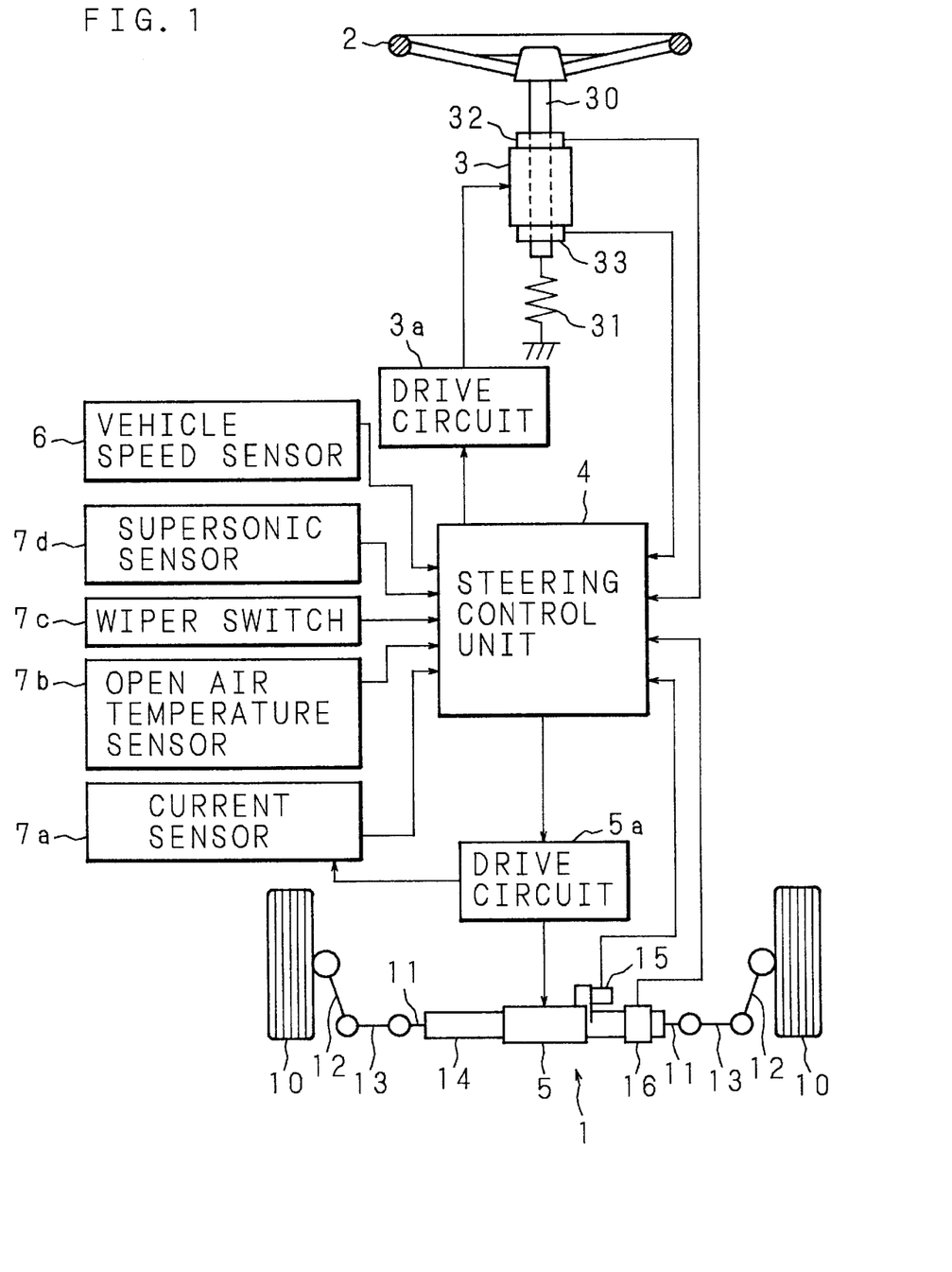
FIG. 1 is a block diagram showing the whole construction of a steering system for an automobile in accordance with the present invention.

One embodiment of the present invention will be described hereinafter in detail in accordance with the drawings. FIG. 1 shows a schematic view of a mechanical system and a block diagram of a control system for showing the whole construction of a steering system for an automobile in accordance with the present invention.

The steering system for an automobile in accordance with the present invention is provided with a steering mechanism 1 for causing a pair of right and left wheels 10, 10 for steering use, to effect the steering operation, which arranged to right and left side of the automobile body (not shown); a steering wheel 2, which is a steering operating means, disengaged from the steering mechanism 1; a reaction force actuator 3 for giving the reaction force to the steering wheel 2; a steering control unit 4 which functions as a reaction force controlling means as well as a steering controlling means by the use of the microprocessor. The steering system for the automobile in accordance with the present invention drives a steering motor 5 as the steering actuator arranged halfway in the steering mechanism 1 by the operation of the steering control unit 4 in accordance with the operation of the steering wheel 2 to operate the steering mechanism 1.

The steering mechanism 1, as known conventionally, couples both the end portions of a steering shaft 11 to be slid in the shaft length direction extended in the right and left directions of the automobile body to knuckle arms 12, 12 for supporting the wheels 10, 10 by respectively different tie rods 13, 13 to push or pull the knuckle arms 12, 12 through the tie rods 13, 13 by the sliding operation in both the directions of the steering shaft 11 to operate the wheels 10, 10 to right, left. The steering operation is executed by converting the rotation of the steering motor 5 constructed coaxially halfway in the steering shaft 11 into the sliding movement of the steering shaft 11 by a proper movement conversion mechanism.

Figure 2:
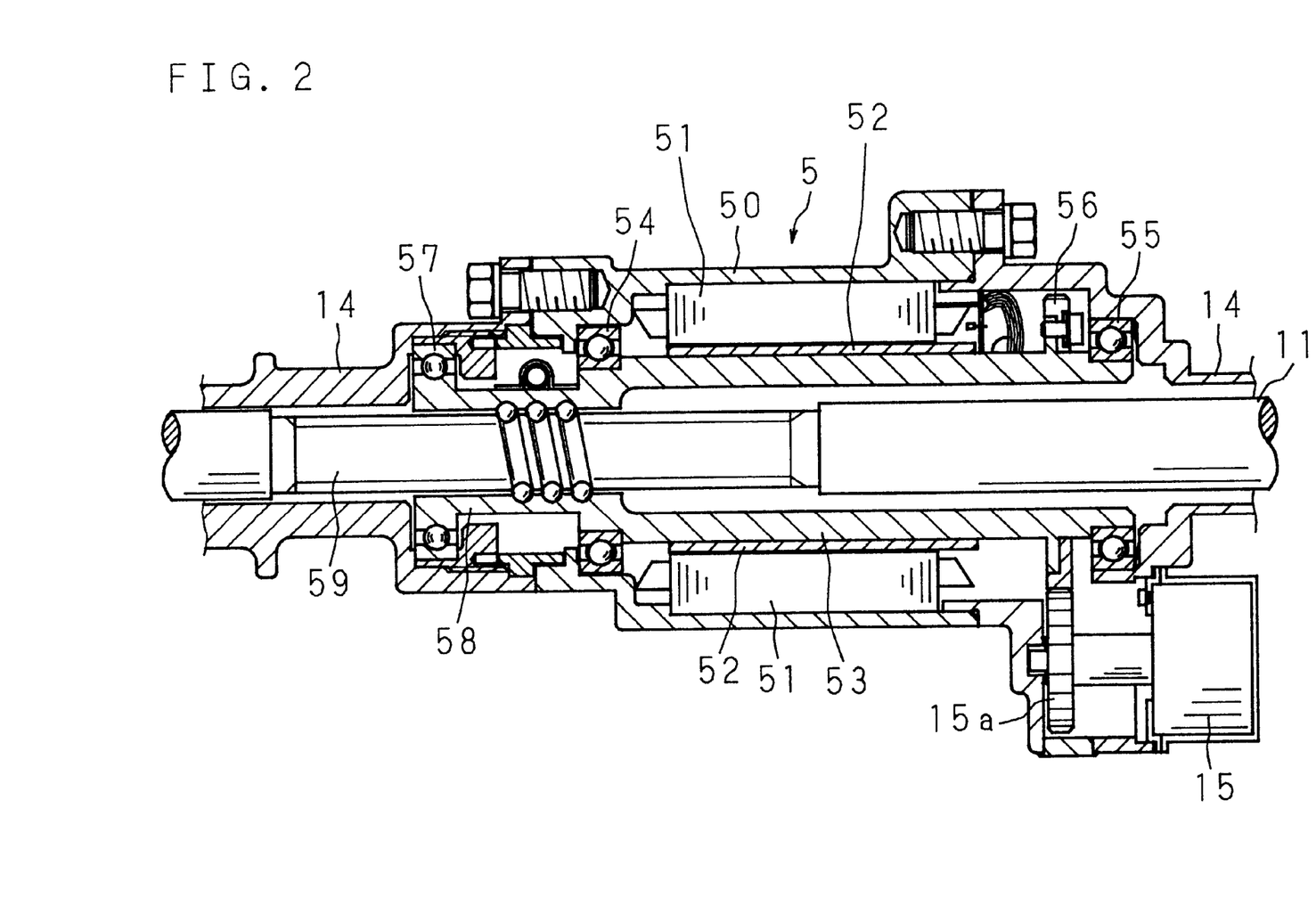
FIG. 2 is a longitudinally sectional view of the essential portion showing one example of a steering motor of a steering system and a movement converting mechanism for an automobile in accordance with the present invention.

FIG. 2 is a longitudinally sectional view of the essential portions showing one example of the steering motor 5 and the movement conversion mechanism. The steering motor 5 is positioned within the cylindrical motor housing 50 grasped halfway in the steering shaft housing 14 for its free sliding movement in the length direction of the steering shaft 11. Concretely, the steering motor 5 is composed as a 3-phase brushless motor comprising a stator 51 provided peripherally on the inner face of the motor housing 50 and a rotor 52 opposite to the other side of the stator 51 across a slight gap.

The rotor 52 is fixed onto the outer periphery halfway in the cylindrical rotor cylinder 53 having an inside diameter larger than the outside diameter of the steering shaft 11. The rotor 52, together with the rotor cylinder 53, is supported at two positions with ball bearings 54, 55 which are internally fixed respectively to the steering shaft housing 14 continuous to one side of the motor housing 50 and the other side of the motor housing 50, so as to be supported for its free coaxial rotation inside the stator 51. The rotor 52 is rotated integrally with the rotor cylinder 53 in both the normal or reverse directions by energizing the stator 50 through a drive circuit 5a in accordance with the operation instruction signal from the steering control unit 4.

A gear 56 is secured on the outer periphery of one side (supported side by the ball bearing 55, namely, the right side in FIG. 2) of the rotor cylinder 53. The gear 56 is engaged with an input gear 15a of a rotary encoder 15 which is secured on the outer side of the corresponding position of the steering shaft housing 14. Accordingly, the rotating position of the rotor 52 integrally rotating with the rotor cylinder 53 is detected as the output of the rotary encoder 15.

Also, the other side (supported side by the ball bearing 54, namely, the left side in FIG. 2) of the rotor cylinder 53 is extended beyond the supported portion by the ball bearing 54, and is supported within the steering shaft housing 14 on the same side by a ball bearing 57 formed integrally at an extension end thereof. A ball nut 58 with the track of the ball screw being cut in it is formed on the extension portion of the rotor cylinder 53, namely, on the inner face of a portion between positions to be supported by the ball bearing 54 and the ball bearing 57. On the other hand, a ball screw portion 59 with the track of the ball screw being cut spirally is formed extending for a predetermined length on the outer periphery of the steering shaft 11, so that a ball screw mechanism is formed by the screwing through many balls with the ball nut 58 opposite onto the external side of the ball screw portion 59.

The steering shaft 11 is restrained in axial rotation by rotation restraining means not shown interposed with respect to the steering shaft housing 14. Accordingly, the rotation of the steering motor 5, namely, the rotation of the rotor 52 by energizing the stator 51 is converted into the sliding movement in the length direction of the steering shaft 11 by the screwing of the above described ball nut 58 with the ball screw portion 59 integrally formed with the steering shaft 11. Thus, the steering (steering operation of the wheels 10, 10 for steering use) is realized in accordance with the rotation of the steering motor 5.

The steering angle of the wheels 10, 10 to be steered in such manner is detected through a sliding position of the steering shaft 11 by a steering angle sensor 16 (see FIG. 1) facing the inner side of the steering shaft housing 14 on one side of the steering motor 5. The output of the steering angle sensor 16, together with the output of the rotary encoder 15 for detecting the rotation position of the steering motor 5, is given to the steering control unit 4.

The reaction force actuator 3 for giving the reaction force to the steering wheel 2, an electric motor (for example, 3-phase brushless motor) having a rotary shaft 30 projecting onto both the sides, as schematically shown in FIG. 1, is mounted with it casing being fixed to an appropriate portion of the automobile body not shown. The steering wheel 2 is fixed coaxially to the projecting end of one side of the rotary shaft 30. The projection end of the other side of the rotation shaft 30 is coupled to an appropriate position of the automobile body not shown by a torsion spring 31 having predetermined elasticity.

The reaction force actuator 3 gives the force (reaction force) opposite to the operating direction to the steering wheel 2 mounted on one end of the rotation shaft 30 by driving in both the normal and reverse directions by energizing from the drive circuit 3a corresponding to the operation instruction signal given from the steering control unit 4. Accordingly, the steering torque against the reaction force caused by the reaction force actuator 3 is required to be applied to the rotation operating of the steering wheel 2. The steering torque to be applied to the steering wheel 2 is such manner is detected by the torque sensor 32 provided on the reaction force actuator 3. Also, the operation amount of the steering wheel 2, together with the operating direction, is detected by a rotary encoder 33 provided on the reaction force actuator 3. The detected results by the torque sensor 32 and the rotary encoder 33 are given to the steering control unit 4.

The torsion spring 31 interposed between the other end of the rotary shaft 30 and one portion of the automobile body rotates the rotary shaft 30 by its elasticity at the stop time of the rotation of the steering wheel 2 as described above to make the steering wheel 2 return to the predetermined neutral position. The returning is required to return the steering wheel 2 accompanied by the restoring action into the straight direction of the wheels 10, 10 in the steering mechanism 1 which is mechanically disengaged from the steering wheel 2.

The steering condition actually caused in the steering mechanism 1 side is given as the input from the rotary encoder 15 and the steering angle sensor 16 to the steering control unit 4 as described above. Also, to the steering control unit 4, the condition of the operation of the steering wheel 2 as the steering operating means is given respectively as the inputs of the torque sensor 32 and the rotary encoder 33. Also, in addition to them, the output of the vehicle speed sensor 6 for detecting the running speed of the automobile, and the outputs of a current sensor 7a for detecting the motor current of the steering motor 5, an open air temperature sensor 7b for detecting the open air temperature, a wiper switch 7c which turns on when the wiper is in an operating condition, and an supersonic wave sensor 7d for detecting the unevenness of the road surface by receiving the supersonic waves transmitted towards the road surface, which are the road surface condition detecting means for detecting the condition of the road surface on which the automobile is running are given to the input side of the steering control unit 4.

As described above, the output of the steering control unit 4 is given to the reaction force actuator 3 for giving the reaction force to the steering wheel 2, and the steering motor 5 for making the steering mechanism 1 execute the steering operation through the respective separate drive circuit 3a, 5a. The reaction force actuator 3 and the steering motor 5 execute the respective separate operation in accordance with the operation instructions from the steering control unit 4.

The steering control unit 4 functions as the reaction force controlling means for outputting the operation instructions to make the reaction force actuator 3 generate the reaction force. Concretely, the steering control unit 4 decides so that the reaction force to be given to the steering wheel 2, for example, may become larger or smaller in accordance with the higher and lower of the vehicle speed given as inputs from the vehicle speed sensor 6. The decided results are corrected in accordance with the condition of the road surface on which the automobile is running to be presumed by the inputs from the current sensor 7a, the open air temperature sensor 7b, the wiper switch 7c, and the supersonic wave sensor 7d to output the operation instructions to the reaction force actuator 3, thereby generating the reaction force S after the correction.

Also, the steering control unit 4 functions as steering controlling means for driving the steering motor 5 until the target steering angle Θ is obtained. Concretely, the steering control unit 4 recognizes the magnitude of the steering torque T applied to the steering wheel 2 with use of the input from the torque sensor 32 to decide the energizing amount (motor current) of the steering motor 5 necessary for obtaining the steering force corresponding to the magnitude of the steering torque T. The operating angle $\theta_1$ including the operating direction of the steering wheel 2 is recognized by the input from the rotary encoder 33, and operating angle $\theta_1$ is corrected so that it may become larger or smaller in accordance with the slower or higher speed of the vehicle speed to be given as the input from the vehicle speed sensor 6 to obtain the target steering angle Θ. Then, the steering angle deviation Δθ between the operating angle $\theta_1$ and an actual steering angle $\theta_2$ recognized by the input of the steering angle sensor 16 provided in the steering mechanism 1 is obtained to drive the steering motor 5 until the steering angle deviation becomes "0". At this time, the input to the steering control unit 4 from the rotary encoder 15 is used as the feedback signal for checking whether or not the steering motor 5 has reached the desired rotating position.

Figure 3:
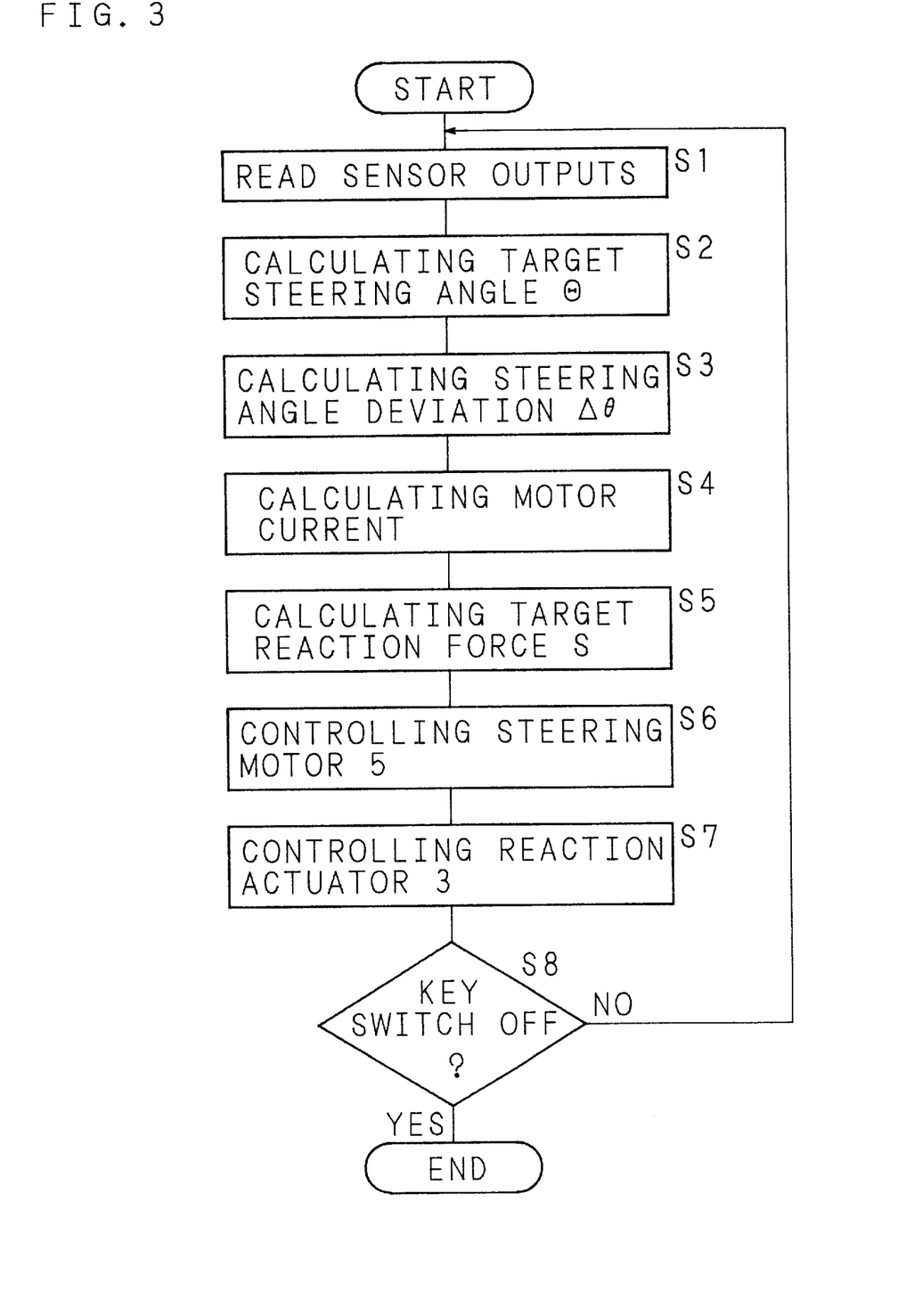
FIG. 3 is a flow chart showing the control procedure of a steering control unit of a steering system for an automobile in accordance with the present invention.

FIG. 3 is a flow chart showing the control procedure of a steering control unit 4. The steering control unit 4 starts the operation in accordance with the on operation of a key switch for actuating the engine. First, the steering control unit 4 reads the output of each of the above described sensors (step S1), and then, calculates the target steering angle Θ (step S2) by the following equation (1), further, calculates the steering angle deviation Δθ (step S3).

$$\Theta = K_0 \cdot \theta_t \tag{1}$$

$K_0$ in the equation (1) is a correction coefficient which becomes larger or smaller in accordance with the slower or higher speed of the detected vehicle speed by the vehicle speed sensor 6, for example, "1" when the detected vehicle speed exceeds the predetermined speed, and such a correction coefficient as becomes larger in accordance with the low vehicle speed when the detected vehicle speed becomes a predetermined speed or lower. The target steering angle Θ obtained by the calculation at the step S2 is equal to the operating angle $\theta_1$ which actually generates at high speed running, and becomes larger than the operating angle $\theta_1$ at low speed running.

Then, the steering control unit 4 calculates the motor current (step S4) to be fed to the steering motor 5 with the use of the steering torque T applied to the steering wheel 2 recognized by the input from the torque sensor 32. The calculation is carried out as in the calculation of the motor current for assisting steering in the electric power steering system. Fundamentally, such a motor current as to increase accompanied by the increase of the steering torque T is obtained from, for example, a predetermined map set with respect to the steering torque T.

Figure 4:
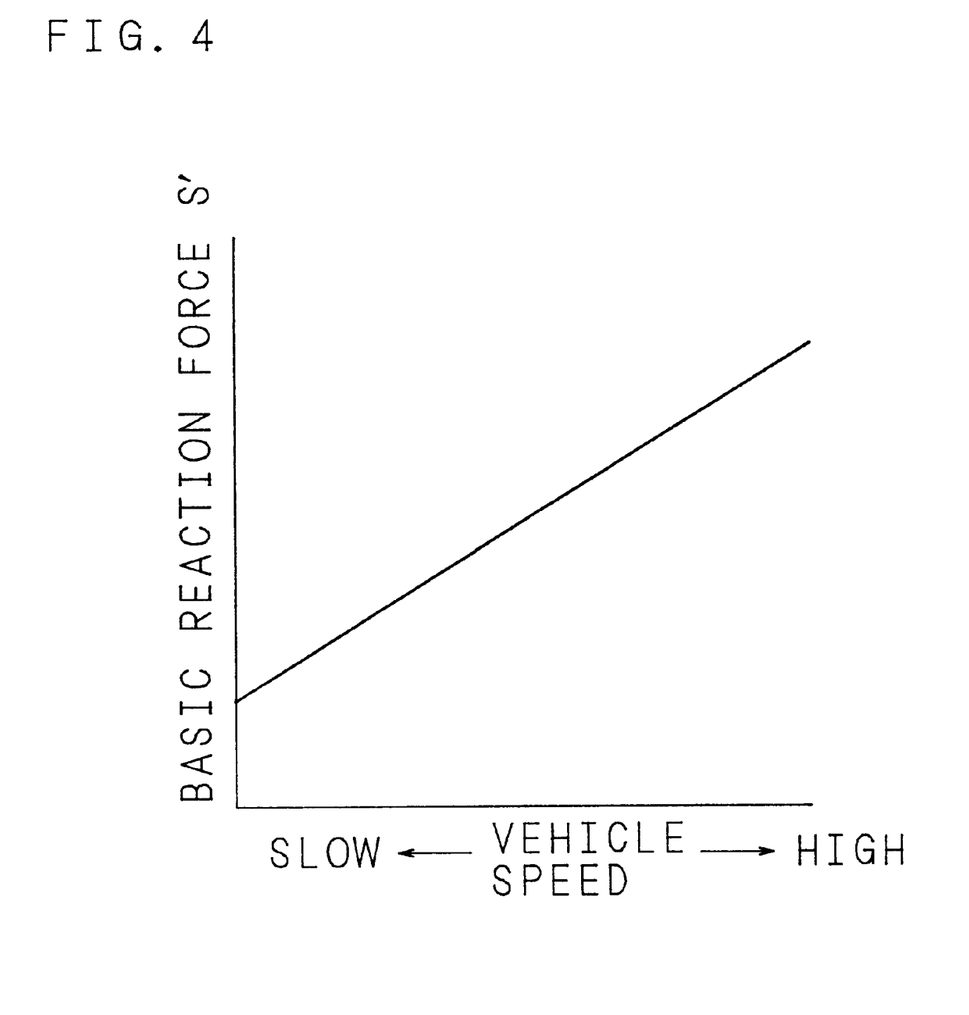
FIG. 4 is a graph showing the relationship between the vehicle speeds by the steering control unit of the steering system for an automobile in accordance with the present invention and the reaction force to be applied to the steering wheel in accordance with them.

Then, the steering control unit 4 calculates the reaction force S to be given to the steering wheel 2 (step S5). The calculation is carried out as follows. First, basic reaction force S' is set with use of the detected vehicle speed by the vehicle speed sensor 6. The setting has only to be increased proportionally accompanied by the increase of the vehicle speed as shown in FIG. 4. The target reaction force S is obtained by the following equation (2) with use of the basic reaction force S' set in this manner.

$$S = K_1 \cdot K_2 \cdot S' \qquad (2)$$

Figure 5:
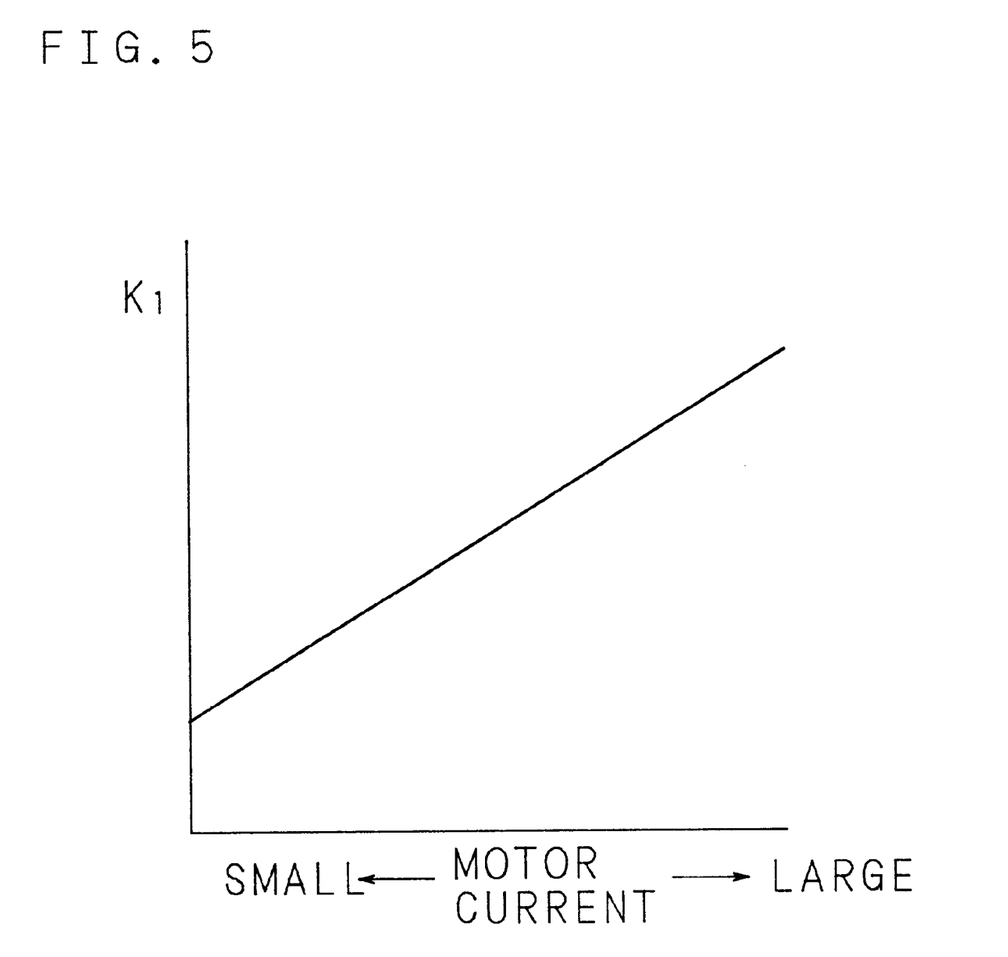
FIG. 5 is a graph showing the relationship between the motor current by the steering control unit of the steering system for an automobile of the invention and the correcting coefficient of the reaction force to be generated in accordance with them.

$K_1$, $K_2$ in the equation (2) are correction coefficients set in accordance with the inputs from the current sensor 7a, the open air temperature sensor 7b, the wiper switch 7c, and the supersonic wave sensor 7d, which are the road surface condition detecting means. The motor current which actually flows to the steering motor 5 and is detected by the current sensor 7a corresponds to the road reaction force to be applied to the wheels 10, 10 for steering use, and is used as information showing the condition of the road surface on which the automobile is running. Accordingly, the correction coefficient $K_1$ is set to increase with the increase in the motor current (road surface reaction) as shown in FIG. 5.

The inputs from the other sensors, that is, the open air temperature sensor 7b, the wiper switch 7c, and the supersonic sensor 7d are used as presumption of the friction coefficients of the road surface on which the automobile is running. That is, when the wiper switch 7c turns on, it can be judged that the road surface is slippery in rain condition. In further addition, when the detected temperature by the open air temperature sensor 7b is lower than the predetermined temperature, it can be judged that the road surface is much slippery in deep snow or frozen condition. Accordingly, the friction coefficient on the road surface can be presumed from the detection results of these wiper switch 7c and the open air temperature sensor 7b. Also, the output of the supersonic sensor 7d shows the unevenness of the road surface, so that the friction coefficient of the road surface can be presumed.

Figure 6:
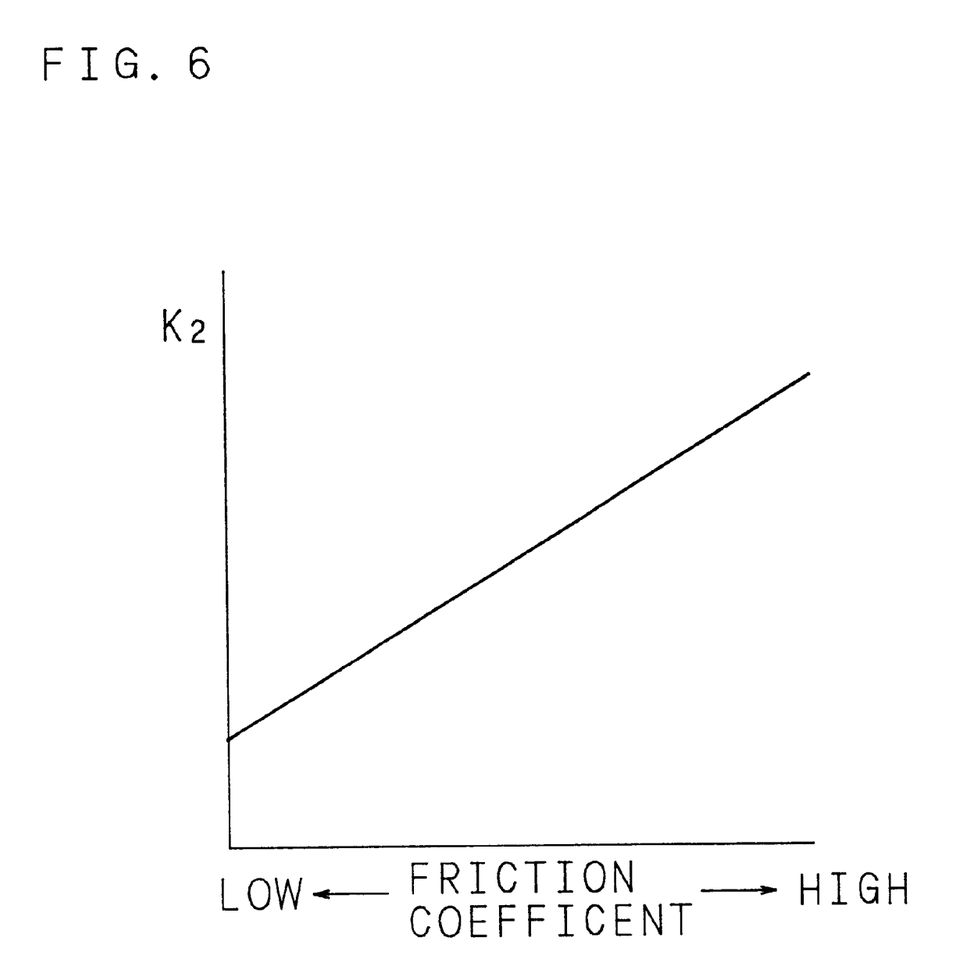
FIG. 6 is a graph showing the friction coefficient of the road surface by the steering control unit of the steering system for the automobile of the invention and the correction coefficient of the reaction force to be generated in accordance with them.

The steering control unit 4 presumes the friction coefficient $\mu$ of the road surface by collecting the inputs from the open air temperature sensor 7b, the wiper switch 7c, and the supersonic wave sensor 7d, and sets the correction coefficient $K_2$ to be increased in accordance with the increase of the friction coefficient $\mu$ by applying to the graph shown in, for example, FIG. 6. The target reaction force S obtained by the above described equation (2) using the correction coefficients $K_1$ and $K_2$ obtained in such manner becomes a value such that the basic reaction force S' set in accordance with the vehicle speed is decreased when the road surface on which the automobile is running is slippery, and is increased when it is hard to slip.

Then, the steering control unit 4 outputs an operation instruction to the steering motor 5 (step S6) to obtain the target steering angle Θ calculated by the equation (1), and outputs an operation instruction to the reaction force actuator 3 (step S7) to obtain the target reaction force S calculated by the equation (2). The steering control unit 4 repeats the procedure from the step S1 to the step S7 as described above until the key switch is turned off (step S8).

In the steering system for an automobile in accordance with the present invention as described above, the operating steering angle $\theta_1$ is corrected as described above to obtain the target steering angle Θ, and the steering angle deviation Δθ is obtained as the difference between the actual steering angle $\theta_2$ and the target steering angle Θ. Then, the controlling of the steering motor 5 is executed to make the steering angle deviation Δθ becomes "0". At the low speed running time, the wheels 10, 10 for steering use are steered larger than the actual operation amount of the steering wheel 2, so that the heaviness and both of the steering operation at garaging an automobile, bringing the automobile near to crosswise direction are disappeared. Also, such effect is achieved without the complicated construction and the weight increasing by the correction as described above in the steering control unit 4.

Also, the reaction force actuator 3 generates the target reaction force S to be set as described above in accordance with the running speed detected by the vehicle speed sensor 6, the road surface condition at running obtained from the detection results by the current sensor 7a, the open air temperature sensor 7b, the wiper switch 7c, and the supersonic wave sensor 7d. Thus, the steering wheel 2 becomes heavy at low speed running and light at high speed running. The steering wheel 2 is lighter when the road surface is easy to slip, and heavier when the road surface is hard to slip. Accordingly, the operation of the steering wheel 2 is effected to drivers with the same feelings as the conventional general coupling type steering system. Also, the motor current decided in accordance with the steering torque T applied to the steering wheel 2 in this condition is fed to the steering motor 5, so that reliable steering operation can be effected.

The correction of the target reaction force S in accordance with the detected result of the road surface condition is not limited to the correction technique following the graph shown in FIG. 5 and FIG. 6 described in the above embodiment. For example, the increase in the correction coefficients $K_1$, $K_2$ accompanied by increase of the motor current or the friction coefficient $\mu$ may be caused in a curve line. Conversely the correction coefficients $K_1$, $K_2$ to decrease in accordance with increase of the motor current or the friction coefficient $\mu$ may be adopted.

The detecting means of the road surface condition may be another one without restriction to the current sensor 7a, the open air temperature sensor 7b, the wiper switch 7c and the supersonic wave sensor 7d described in the above embodiment. For example, when a lateral G sensor for detecting the lateral acceleration acting upon the automobile is provided, and the detection results of the lateral G sensor are smaller than the basic lateral acceleration to be presumed from the vehicle speed and the steering angle, it can be judged that the road surface is in a slippery condition. Thus, in such a case, it is possible to properly increase or decrease the reaction force of the reaction force actuator 3 to prevent the dangerous operation of the steering wheel 2.

The target reaction force S witch is the control target of the reaction force actuator 3 may be corrected with use of the other detection result showing not only the vehicle speed and the road surface condition, but also the running condition. For example, the steering angle deviation Δθ obtained in, for example, the step S2 of FIG. 3 can be used. Concretely, it is possible to prevent the excessive operation of the steering wheel 2, so-called quick steering operation in construction by the correcting operation of increasing the target reaction force S when the operation amount of the steering wheel 2 is large.

The above described embodiment shows one example of the steering system in accordance with the present invention. Without restriction to the construction of the reaction force actuator 3 and the steering motor 5, it is needless to say to use the other operating means such as a lever, a joy stick or the like, instead of the steering wheel 2 as the steering operating means.

In the steering system in accordance with the first aspect of the present invention as described in detail, the running speed of the automobile and the condition of the road surface on which the automobile is running are detected to apply the reaction force decided in accordance with these detection results to the steering operating means disengaged from the steering mechanism. Therefore, the steering feeling close to that of the conventional general coupling type steering system is obtained, making it possible to effect a reliable steering operation.

Also, in the steering system in accordance with the second aspect, the change factor in the operation amount of the steering actuator with respect to the operation amount of the steering operating means is adapted to increase, and decrease in accordance with the detected results of the vehicle speed. Therefore, it is possible to remove, without complication of the construction and the weight addition, the heaviness and bother of the steering operation in the low speed running time or the stop time in garaging the automobile, bringing the automobile near to crosswise direction or the like.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within metes and bounds of the claims, or equivalence of such metes and bounds thereof are therefore intended to be embraced by the claims.

What is claimed is:

1. A steering system for an automobile including a steering mechanism, comprising:

steering operating means which is mechanically disengaged from the steering mechanism;

a steering actuator applying a steering force to said steering mechanism in accordance with the operating direction and operation amount of said steering operating means;

a reaction force generator providing a reaction force to said steering operating means opposite to the operating direction of said steering operating means;

a steering controller controlling the steering force generated by said steering actuator in accordance with the magnitude of the steering force applied to said steering operating means against the reaction force provided by said reaction force generator;

a vehicle speed detector detecting the running speed of the automobile;

a road surface condition detector detecting the traction of the road surface on which the automobile is running; and a reaction force controller controlling the reaction force generated by said reaction force generator in accordance with the traction detected by said road surface condition detector and the vehicle speed detected by said vehicle speed detector.

2. A steering system for an automobile as set forth in claim 1, wherein said road surface condition detector includes at last one of a sensor for detecting the road surface reaction force applied to the wheels for steering use, a temperature sensor for detecting the open air temperature, a sensor for detecting the operating state of a window wiper, and a sensor for detecting the unevenness of the road surface.

3. A steering system for an automobile as set forth in claim 2, wherein said steering actuator includes a motor and said sensor for detecting the road surface reaction force applied to the wheels for steering use includes a current sensor for detecting the motor current of said motor.

4. A steering system for an automobile including a steering mechanism, comprising:

steering operating means which is mechanically disengaged from the steering mechanism;

a steering actuator applying a steering force to said steering mechanism in accordance with the operating direction and operation amount of said steering operating means;

a reaction force generator providing a reaction force to said steering operating means opposite to the operating direction of said steering operating means;

a steering controller controlling the steering force generated by said steering actuator in accordance with the magnitude of the steering force applied to said steering operating means against the reaction force provided by said reaction force generator; and a vehicle speed detector detecting the running speed of the automobile;

said steering controller being constructed to control the variation ratio of the operation amount of said steering actuator with respect to the operating amount of said steering operating means based on the detected result of said vehicle speed detector.

5. A steering system for an automobile as set forth in claim 4, wherein said road surface condition detector includes at least one of a sensor for detecting the road surface reaction force applied to the wheels for steering use, a temperature sensor for detecting the open air temperature, a sensor for detecting the operating state of a window wiper, and a sensor for detecting the unevenness of the road surface.

6. A steering system for an automobile as set forth in claim 5, wherein said steering actuator includes a motor and said sensor for detecting the road surface reaction force applied to the wheels for steering use includes a current sensor for detecting the motor current of said motor.

7. A steering system for an automobile including a steering mechanism, comprising:

steering operating means which is mechanically disengaged from the steering mechanism;

a steering actuator applying a steering force to said steering mechanism in accordance with the operating direction and operation amount of said steering operating means;

a reaction force generator providing a reaction force to said steering operating means opposite to the operating direction of said steering operation means;

a steering controller controlling the steering force generated by said steering actuator with the magnitude of the steering force applied to said steering operating means against the reaction force provided by said reaction force generator;

a vehicle speed detector detecting the running speed of the automobile;

a road surface condition detector detecting the traction of the road surface on which the automobile is running; and a reaction force controller controlling the reaction force generated by said reaction force generator in accordance with the traction detected by said road surface condition detector and the vehicle speed detected by said vehicle speed detector;

said steering controller being constructed to control the variation ratio of the operation amount of said steering actuator with respect to the operation amount of said steering operating means based on the detected result of said vehicle speed detector.

8. A steering system for an automobile as set forth in claim 7, wherein said road surface condition detector includes at least one of a sensor for detecting the road surface reaction force applied to the wheels for steering use, a temperature sensor for detecting the open air temperature, a sensor for detecting the operating state of a window wiper, and a sensor for detecting the unevenness of the road surface.

9. A steering system for an automobile as set forth in claim 8, wherein said steering actuator includes a motor and said sensor for detecting the road surface reaction force applied to the wheels for steering use includes a current sensor for detecting the motor current of said motor.

* * * * *